May 3, 1960     A. E. R. ARNOT     2,935,090

VALVE SYSTEMS FOR PRESSURE FLUID CIRCUITS

Filed Sept. 4, 1958     4 Sheets-Sheet 1

INVENTOR

Alfred Erwin Reginald Arnot

By

Martin Kirkpatrick

May 3, 1960   A. E. R. ARNOT   2,935,090
VALVE SYSTEMS FOR PRESSURE FLUID CIRCUITS
Filed Sept. 4, 1958   4 Sheets-Sheet 2

INVENTOR
Alfred Erwin Reginald Arnot

By
Martin Kirkpatrick

May 3, 1960  A. E. R. ARNOT  2,935,090
VALVE SYSTEMS FOR PRESSURE FLUID CIRCUITS
Filed Sept. 4, 1958  4 Sheets-Sheet 4
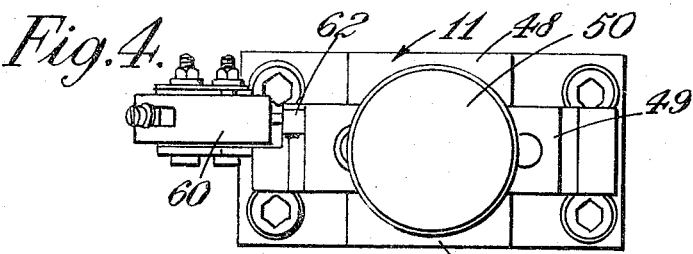
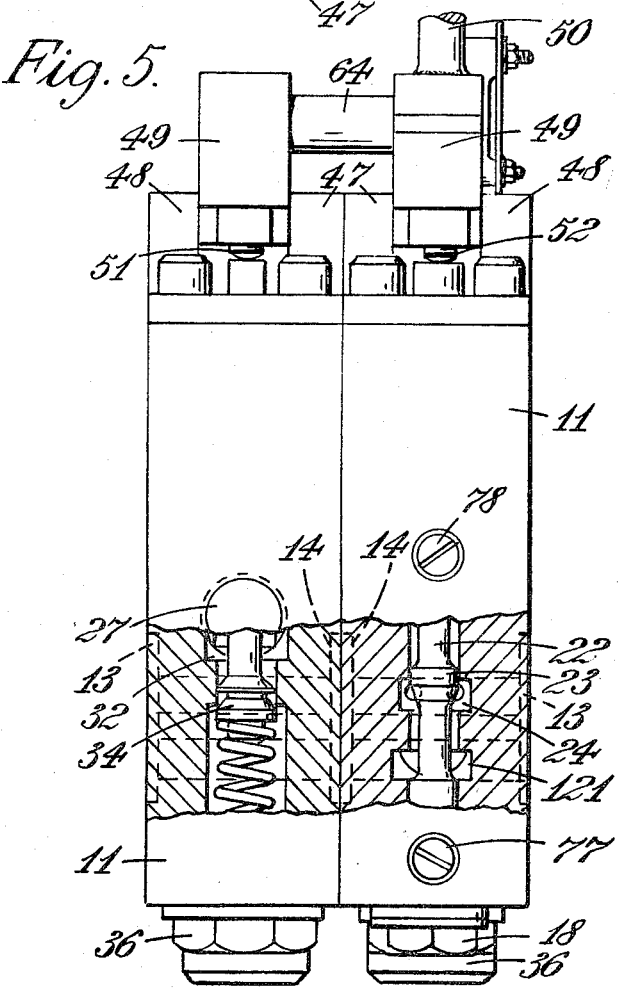
INVENTOR
Alfred Erwin Reginald Arnot
By
Martin Kirkpatrick

United States Patent Office 2,935,090
Patented May 3, 1960

2,935,090

VALVE SYSTEMS FOR PRESSURE FLUID CIRCUITS

Alfred Erwin Reginald Arnot, Basingstoke, England, assignor to Lansing Bagnall Limited, Basingstoke, England, a British company Application September 4, 1958, Serial No. 758,960

Claims priority, application Great Britain September 4, 1957

12 Claims. (Cl. 137—622)

The present invention comprises improvements in or relating to valve systems for pressure fluid circuits and is particularly, but not exclusively, concerned with systems for use with hydraulic circuits employed in fork lift and like industrial trucks.

It is known in such circuits to bank two or more valves (e.g. for actuating a mast tilting mechanism or a fork lifting mechanism) connected from the pressure line in parallel so that pressure fluid is fed to each valve separately. There must also be a separate return line from each valve. For continuously operated pumps such as are used on diesel-engined industrial trucks, provision has to be made for pressure fluid to pass through each of the valves to drain. The connection to each valve is usually by external piping and if any one valve of a bank is operated the flow to the others has to be interrupted by blocking the pressure line to each other valve otherwise pressure fluid would pass to the other valve and pressure could not be maintained in the valve it is desired to operate. Consequently separate blocking and valve operating mechanisms are required. It is a feature of the present invention so to bank two or more valves that mechanical connection to the other valves in the bank and external interconnection of the valves by piping may be dispensed with.

According to the present invention, a valve system for controlling a plurality of fluid-pressure-operated devices comprises in combination a plurality of valves arranged in series, each of which comprises a two-way valve-member controlling fluid-flow from an inlet to the valve to one or other of two outlets, one outlet of the first valve being connected to the inlet of the second and so on through any further valves in the series, and the other outlets of the valves being available for connection to the fluid-pressure operated devices.

The invention includes a fluid-pressure control-valve having a valve-body, an inlet, two outlets, a two-way valve-member movable to direct pressure fluid to either outlet at will and an operating member for said valve member, one of the outlets being such as to be readily connectable to the inlet of a second similar valve without obstructing the other and such that when so connected the valve bodies are in alignment with one another.

Preferably, according to the invention, a fluid-pressure control-valve has a valve-body with parallel lateral faces, an inlet-port in one face, a first outlet-port in the opposite face located so that a plurality of the valves can be ganged up by securing them together with their lateral faces in contact and the outlet of one leading to the inlet of the other, a second outlet-port and a valve-member movable from a position in which it directs the fluid to one outlet-port into a second position in which it directs the fluid to the other outlet-port. Preferably the said first outlet-port is coaxial with the inlet-port. This enables a number of valves to be ganged up together side by side with the outlet from one abutting against the inlet of the next, the valves remaining in line with each other.

In a preferred construction the valve-member is a piston-valve operating in a bore in the valve-body transverse to the inlet and first outlet-ports and a movable valve-operating member is pivoted on the exterior of the valve-body to one side of said bore, to actuate said piston-valve.

A second bore may be provided in the valve-body, parallel with the first, and arranged on the opposite side of the pivot of the valve-operating member from the first bore, said second bore containing a second piston-valve operable to open a connection from the second outlet-port to an exhaust-port.

The invention includes an assembly of a pair of fluid-pressure control-valves as just described, wherein the inlet-port and the first outlet-port are coaxial with one another and which are assembled together in reversed position so that the second bore of the first valve is side-by-side with the first bore of the second valve and wherein the operating members are connected together to act as one and thereby to form a reversing valve for the control of a double-acting fluid-pressure device.

A further disadvantage arising with known valve arrangements is that if for instance in a fork lift truck an overhead obstruction causes the forks or mast to tilt against the action of the jacks, the rams thereof will be forced outwardly and the jacks will draw in air in these circumstances. Also if the load causes the forks or mast to be moved quicker than the jacks normally allow, the jacks will draw in air through their seals.

A further feature of the invention therefore provides that the chamber between the two bores houses a non-return valve which is spring urged to seat upon that part of the chamber communicating with the first bore. The valve acts as a recuperating valve in the above circumstances permitting pressure fluid to be drawn into the jack or other member to fill the vacuum so formed.

Yet a further disadvantage with known valve banks is that there may be interaction between the valves in the bank due to fluid leakage past passage blocking members. This fluid leakage might well accumulate and assume in time appreciable proportions having a serious effect.

A feature of the present invention provides an exit to drain to remove any fluid leakage. According to a feature of the invention the said exit to drain is provided in the first said bore at a point or points beyond the connection thereof to the second outlet-port. Fluid leaking past the piston-valve which might normally have adverse effects will therefore pass off through to drain as being the way of least resistance.

One construction of valve in accordance with the invention will now be described by way of example, reference being made to the accompanying drawings in which:

Figure 4 is a plan;

Figure 5 shows two valves ganged together back to back to form a reversing valve; and Figure 6 is a diagrammatic perspective view of an assembly of valve bodies and hydraulic connections thereto.

Figure 1:
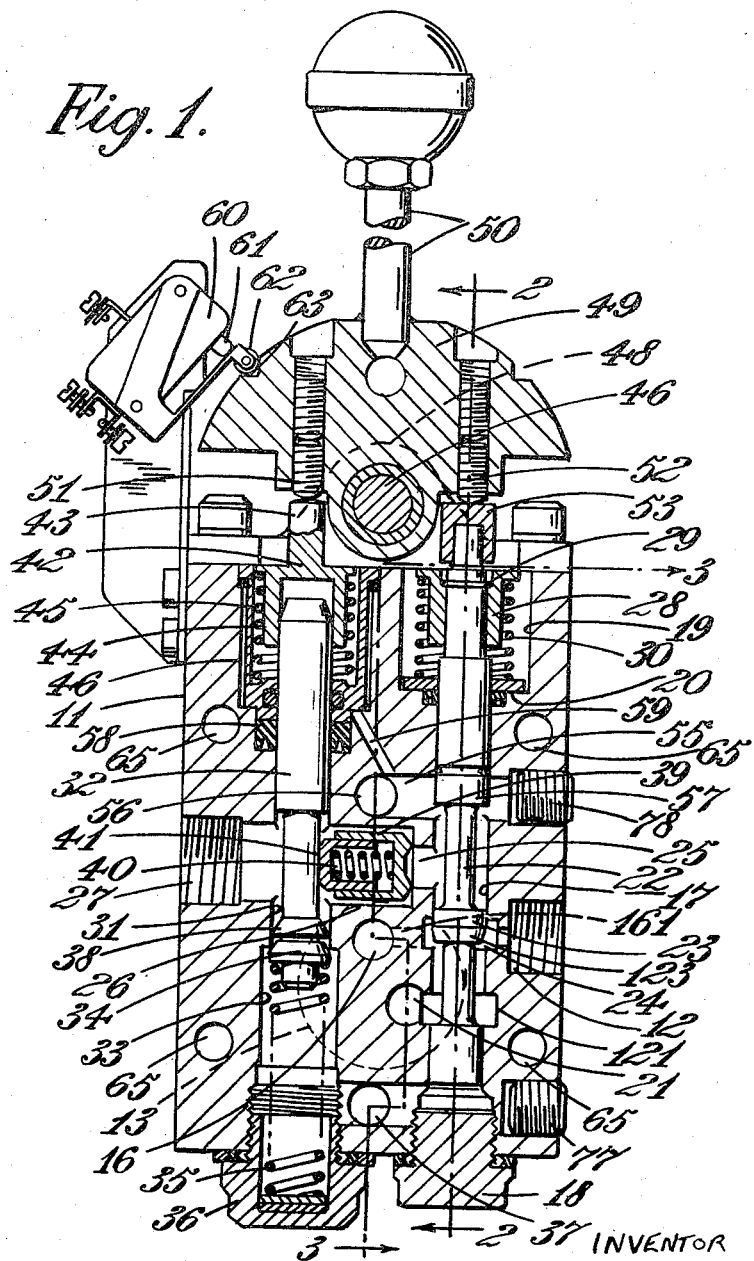
Figure 1 is a longitudinal vertical section through a valve in accordance with the invention.

The valve comprises a valve body 11 which is flat and rectangular and has a pressure-fluid inlet 12 (Figure 1) in one of its narrower flat faces. Each of the larger flat faces 15 of the valve body (see Figure 2) contains on its vertical centre-line a circular recess, 13 or 14, and the recesses 13, 14 are coaxial and connected by parallel cross-passages, an upper cross-passage 16 and a lower cross-passage 21. The inlet 12 leads first to a valve-port 24 (Figure 1) formed as an enlargement in a piston-valve bore 17 which extends through the valve body 11 from top to bottom and which is closed at the lower end by a plug 18. The valve-port 24 communicates also by two drilled passages 161 with the upper cross-passage 16. In the bore 17 is a piston-valve 22 having a land 23 which in the normal position leaves the bores 17 open below the port 24 to pressure, and fluid-pressure therefore has access to a second annular piston-valve port 121 which is intersected by the lower cross-passage 21. Below the land 23 the valve 22 has a tapered regulating section 123 which permits the rate of flow to be regulated according to the degree to which the valve is moved downwards, because the extent of the opening of bore 17 below the port is varied gradually. As hereinafter more fully explained, when the valves are ganged together, the inlets 12, except for one valve of the gang, are plugged up and also plugs are inserted in one end or the other of each cross-passage 16, 21, to direct the path of fluid from valve to valve, and one of the recesses 13 or 14 acts as an inlet port and the other as an outlet port from valve to valve.

If the piston valve 22 is moved downwardly the land 23 will isolate the bore 17 below the annular piston-valve port 24 from the inlet and will therefore cut the inlet off from the lower cross-passage 21 which forms the outlet to the next valve. At the same time, communication will be opened from the inlet to the part of the bore 17 above the land 23, which communicates by a transverse passage 25 (Figure 1) with an outlet-chamber 26 leading to a second outlet-port 27.

Figure 2:
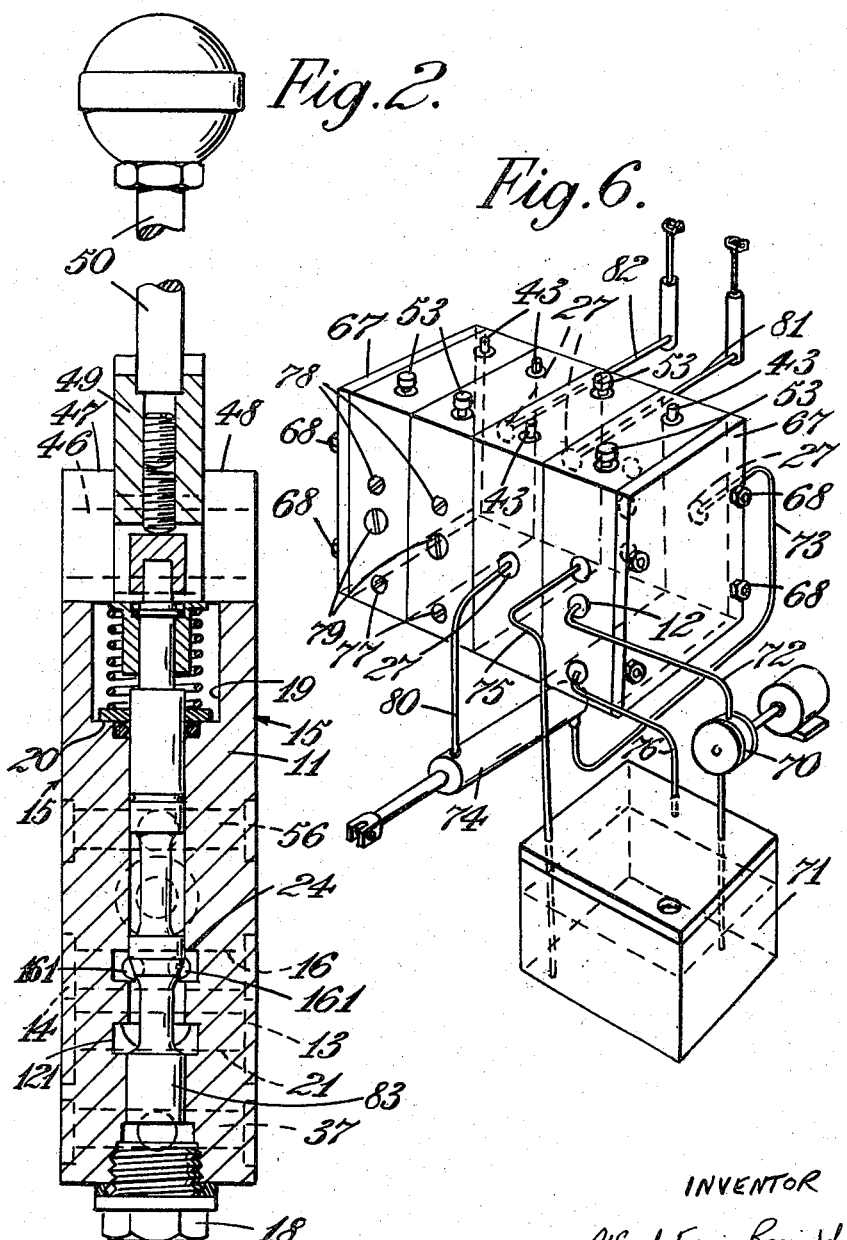
Figure 2 is a transverse section upon the line 2—2 of Figure 1.

The piston-valve 22 extends upwardly into an enlargement 19 having a shoulder 20 at the bottom, and carries a sleeve 28 to which it is locked by a split ring 29 and which overlies a spring 30 tending always to move the valve-member upwards so that the normal position is that shown in Figure 1, where the passage from the inlet 16 to the outlet 21 is open and the passage to the port 27 is closed.

Crossing the chamber 26 is a second bore 31 parallel with the bore 17 and containing a valve-member 32. The upper end of the bore 31 is enlarged in a similar way to the bore 17 and the lower end is also enlarged as shown at 33 to receive a lift-valve head 34 formed on the lower end of the valve-member 32. The head 34 is urged upwardly by a spring 35 finding its seating in a hollow closure cap 36 which closes the bottom end of the bore. The end of the piston-valve 32 just above the lift-valve head 34 has a land 38 with a tapering upper surface to act as a flow-regulator. The spring 35 is strong enough to hold the lift-valve head 34 closed when the valve is not pressed down by the handle 50.

The bore 31 is of the same diameter for its whole length down to the seat of valve 34 and thus the pressure in chamber 26 is balanced hydraulically, upwardly and downwardly, which makes the valve easy to operate, and regulation by the tapering land 38 easy.

In the chamber 26 between the stem of the valve-member 32 and the passage 25, there is located a non-return recuperating valve 39 which is held on a seating around the passage 25 by a spring 40 in a cup 41. The valve-member 39 is, as shown in the section Figure 3, externally square so that it fits the walls of the chamber 26, which are circular, at its corners but allows passage of fluid around it to the second outlet-port 27.

The upper end of the valve 32 enters a tappet-engaging cap 42, having an upstanding stem 43. The cap 42 is urged upwardly by a spring 44 surrounded by a sealing cup 45 seated in a recess 46 (corresponding to recess 19 around valve 22). The spring 44 urges the tappet-engaging cap 42 upwards.

Pivoted on a pivot 46 (which extends across the top of the valve-body 11 between bearings 47, 48) is a rocker 49 which carries a valve-lever 50. In the rocker 49 are adjustable tappets 51, 52 to engage the upper ends of the stem 43 on the valve-cap 42 and of cap 53 on the upper end of valve 22. Thus, rocking lever 50 to the right as viewed in Figure 1 will depress valve 23 and connect the inlet and piston-valve port 24 to passage 25, and outlet-port 27. Rocking the lever to the left will depress valve 34 and connect port 27 to drain at 37. The rate of outflow is regulated by conical portion 38 and depends on how far the lever 50 is rocked over.

Above the port 25 which leads to a chamber 26 is a port 55 leading by a cross-passage 56 to drain. A land 57 on valve 22 closes port 55 when the pressure connection from port 16 is opened. There is an oil seal 58 around the stem of valve 32 (which is subject to pressure) and leakage from the oil seal 58 is drained away by passage 59 leading to drain passage 56. Leakage from the other valve 22 goes direct to the drain by port 55 or, at the bottom, by port 37.

Rocking the control lever 50 either one way or the other from the neutral position closes a switch 60 which makes an electric circuit and starts a motor-driven pump 70 (Figure 6) for pumping oil into the hydraulic circuit. The switch 60 is closed by the action of a pip 61, which is actuated by a cam roller 62. In the mid-position of lever 50 (shown in Figure 1) the roller lies in a notch 63 in the outer surface of rocker 49 (which is curved concentrically about the axis of pivot 46). In this position the switch is open but as soon as it is rocked either way the roller 62 is forced out of the notch 63 and closes the switch.

When operated in one direction the control lever 50 starts the pump and depresses the valve 22 so as to isolate the fluid outlet 21 and place inlet 16 in communication with the central chamber 26 and the second outlet 27. Pressure fluid thus passes to port 27 and so to the jack or other apparatus connected thereto for operation. Release of the lever 50 allows valve 22 to rise and closes the connection of passage 16 with port 27 and also puts the fluid inlet passage 16 in communication with the fluid outlet passage 21. The non-return valve 39 in the central chamber 26 is then urged on to its seating. Movement of the control lever 50 beyond the mid position in the opposite direction causes the valve 34 in the second bore 31 to be opened and the jack or other operated device is placed in communication with the drain port 37 leading from the valve chamber.

Figure 3:
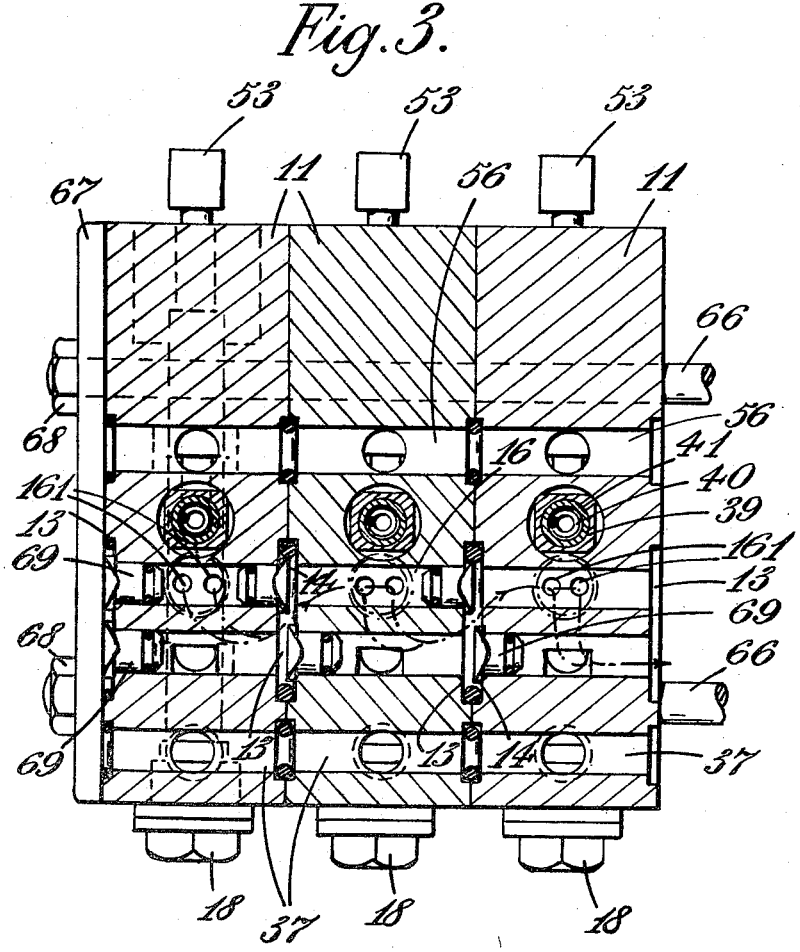
Figure 3 is a section of a bank of three valves, taken upon the line 3—3 of Figure 1.

Figure 3 shows how any number of these valves can be ganged together and fluid will flow internally from valve to valve throughout the whole gang. Each valve is drilled through with four holes 65 (Figure 1) to pass the stems of bolts 66 (Figure 3) on which the valve bodies 11 are threaded; there is an end cover 67 at each end of the gang (one cover only appears in Figure 3) and the whole is held together by nuts 68. The recesses 13, 14 of each valve, being coaxial, align with one another and the drain passages 37 and 56 also come into alignment. Packing rings around the inside of the peripheries of each recess ensure fluid-tight joints. Removable and interchangeable fluid-tight plugs 69 are inserted where necessary in the ends of the passages 16 and 21 so that, as indicated by the chain line, fluid can pass through the pairs of drilled passages 161 into the valve bores 17 and, when the lever 50 is released as shown in Figure 1, can then pass down the bore 17 into the lower piston-valve port 121 and thence by the lower passage 21 to the outlet port constituted by the recess 13 which opens into the inlet-port constituted by the recess 14 of the next valve and so into the upper or inlet passage 16 of the next valve. This route is repeated from valve to valve. As will be obvious, when the lever 50 of any particular valve is moved to depress the piston valve 22 therein, the passages 161 of that valve are closed off and the flow through the valves is interrupted and diverted to the second outlet port 27 of that valve.

Thus, with a plurality of such valves placed in series pressure fluid can flow through one valve to the next and when the pressure is required in any one valve, and the valve lever 50 of that valve is operated, the pressure line to subsequent valves is blocked by the land 23 of the internal valve mechanism operated by the control lever and the whole of the pressure fluid supply is, as long as the lever 50 is held over, fed to the jack or other apparatus being operated.

Figure 5 shows how if two valves are put together and one is reversed in relation to the other so that the two recesses 14 of the two valves come together and the two recesses 13 are on the outside, it is possible to employ them as a combined control valve for a double-acting jack. A single lever 50 is provided above one of the valves on the corresponding rocker 49 and this rocker is coupled to the rocker 49 of the other valve by a tie-rod 64, so that the two rockers move together. It will be appreciated that the result is that rocking the lever 50 in one direction will depress the piston valve 22 of one valve and rocking it in the other direction will depress the piston valve 22 of the other valve. Thus, movement of the lever 50 in one direction can be used to send pressure fluid to one end of the jack and to exhaust the other end, while movement in the other direction will send pressure fluid to the other end of the jack and exhaust the first. The effect is that the double-acting valve can be assembled from two units according to the present invention without any modification of the mechanism or porting of either unit, except the appropriate arrangement of the plugs 69 between the two valves and without necessitating any external pipework.

Figure 6 shows diagrammatically a gang of valve bodies with the appropriate pump and drain connections and connections to jacks. In Figure 6, four valve bodies are shown but it has not been deemed necessary to show the control levers and rockers mounted upon them. There is a reservoir 71 from which the pump 70 draws and delivers by pipe 72 to the inlet 12 and the first valve. The first outlet constituted by the recess 14 of the first valve delivers to the inlet constituted by the recess 14 of the second valve and after this the recess 13 of the second valve is connected to the recess 14 of the third and so on throughout the series without any further external pressure connections. It is assumed in Figure 6 that the first two valves, that is to say those nearest to the reader in the figure, are reversed in relation to each other in the manner shown in Figure 5, but that the others operate as single-acting valves. The second outlet 27 for the first valve is connected by a pipe 73 to one end of a double-acting jack 74 and the drain connection 56 of this valve (which is connected by the cross-passage 55 shown in Figure 1 to the front face of the valve) has its plug removed and a drain connection 75 to the tank 71 substituted. The drain connection 75 is extended to the bottom of the tank so that it is always submerged and in the event of the jack 74 causing suction in the pipe 73 so that the non-return valve 39 opens, the suction can draw up liquid from the tank 71 and so keep the pipe primed. Hence the use of the term "recuperating" valve in regard of the valve 39.

The lower drain passage 37 is connected by a pipe 76 to the tank 71 but this drain passage does not need to be extended to the bottom of the tank. The next valve which is reversed in relation to the first has its outlet 27 connected to the other end of the jack. It operates in exactly the same way and owing to the cross-passages 37 and 56 the same drain pipes 75 and 76 serve for it. The drain passages for the third and fourth valves are stopped up by plugs 77 and 78 and the inlets 12 of these valves are stopped up by plugs 79. The only external pipe connections require therefore the supply 72, the drain pipes 75 and 76 and the pipes 73, 80, 81, 82 from the outlets 27 to the apparatus which is to be controlled.

In the last valve of a gang the land 83 on the bottom end of valve 22 (which in the other valves shuts off the chamber 121 from drain passage 37), is cut off. The result is that when any of the levers 50 of the bank is started into movement (and the pump 70 is started by the corresponding switch 60), the delivery of the pump can return to drain by way of passage 37 and pipe 76 until the lever has moved over far enough to direct the pressure into its delivery pipe, 72, 73, 81 or 82, as the case may be.

I claim:

1. A fluid-pressure control-valve having a valve-body with parallel lateral faces, an inlet port in one face, a first outlet port in the opposite face located so that a plurality of the valves can be ganged up by securing them together with their lateral faces in contact and the outlet of one leading to the inlet of the next, a second outlet port, a valve member movable from a position in which it directs the fluid to one outlet port to a position in which it directs the fluid to the other outlet port, and a non-return recuperating valve disposed between the valve member and the second outlet port.

2. A fluid-pressure control-valve having a valve body with parallel lateral faces, an inlet-port in one face, a first outlet port in the opposite face located so that a plurality of the valves can be ganged up by securing them together with their lateral faces in contact and the said outlet of one leading to the inlet of the next, a second outlet port, said valve body having a piston-valve bore, a piston-valve member in the bore movable from one position in which it directs the fluid from the inlet to one outlet port to a second position in which it directs the fluid to the other outlet port, a second bore in the valve-body parallel with the first, a second valve member in said second bore operable to open the second outlet port to exhaust, and a valve-operating member pivoted on the exterior of the valve body between the axes of the said bores and actuable to operate both said valve members.

3. A fluid-pressure control-valve as claimed in claim 2 wherein the valve-operating member engages the first and second valve members by means of adjustable tappets for the purpose described.

4. A fluid-pressure control-valve as claimed in claim 2 wherein the second valve member is hydraulically balanced for the purpose described.

5. A fluid-pressure control-valve as claimed in claim 2 wherein the second valve member has a tapering regulating section adjoining the valve opening-and-closing portion proper, for the purpose described.

6. An assembly of a pair of fluid-pressure control-valves as claimed in claim 2 wherein the inlet-port and the first outlet-port are coaxial with one another and which are assembled together in reversed position so that the second bore of the first valve is side-by-side with the first bore of the second valve and wherein the operating members are connected together to act as one and thereby to form a reversing valve for the control of a double-acting fluid-pressure device.

7. A fluid-pressure control-valve as claimed in claim 2, wherein a first exit to drain is provided from the first said bore at a point beyond the connection thereof to the second outlet-port.

8. A fluid-pressure control-valve as claimed in claim 2, wherein a second exit to drain is provided from the first said bore at a point beyond the connection thereof to the first outlet-port.

9. A fluid-pressure control-valve as claimed in claim 2 wherein the second bore is provided with a connection to drain.

10. A fluid-pressure control-valve as claimed in claim 7 wherein said first exit to drain passes through the valve body from one flat face to the other so that if a number of valves are ganged together the drain exits align with and so connect with each other without external pipework.

11. A fluid-pressure control-valve comprising a valve body with parallel lateral faces and having an inlet port in one of said faces, a concentric outlet port in the opposite face, two passages connecting said ports and a valve bore extending transversely to and connecting said passages and at another point in its length a connection to a second outlet, a valve member in said bore having land means to control the port of the bore connecting said passages and also to control connection of one of said passages to the second outlet, a second valve bore connected to the second outlet and to a drain outlet, a valve-member therein having valve means to control the port of the second bore between the connections to the second outlet and to drain, a rocker on the valve body, and tappets on the rocker to actuate both said valve members.

12. A fluid-pressure control-valve as claimed in claim 11, wherein removable plugs are provided in said passages to determine the route available for pressure fluid.

References Cited in the file of this patent
UNITED STATES PATENTS

| | | |
|---|---|---|
| 2,483,651 | Lee | Oct. 4, 1949 |
| 2,592,798 | Fenger | Apr. 15, 1952 |
| 2,775,260 | Drennen | Dec. 25, 1956 |
| 2,868,227 | Stephens | Jan. 13, 1959 |
| 2,873,762 | Tennis | Feb. 17, 1959 |